United States Patent [19]

Finley

[11] 3,917,004
[45] Nov. 4, 1975

[54] ADJUSTMENT MEANS FOR OFFSET DISC
[76] Inventor: Delbert D. Finley, R.R. No. 1, Latham, Kans. 67072
[22] Filed: Dec. 3, 1973
[21] Appl. No.: 421,083

[52] U.S. Cl. ................. 172/328; 172/238; 172/663
[51] Int. Cl.² .................... A01B 63/22; A01B 65/00
[58] Field of Search ........... 172/238, 315, 316, 324, 172/326–328, 663, 668; 280/414.5

[56] References Cited
UNITED STATES PATENTS

| | | | |
|---|---|---|---|
| 2,739,396 | 3/1956 | Frenzel | 172/327 |
| 2,797,542 | 7/1957 | Webster et al. | 172/328 |
| 2,857,724 | 10/1958 | Kenney et al. | 172/316 X |
| 3,082,830 | 3/1963 | McKay | 172/328 |
| 3,174,557 | 3/1965 | Newkirk | 172/319 |
| 3,579,873 | 5/1971 | Kershaw | 172/305 X |
| 3,604,378 | 7/1971 | McDaniel | 111/85 |
| 3,809,165 | 5/1974 | Miller | 172/328 |

Primary Examiner—Edgar S. Burr
Assistant Examiner—Paul T. Sewell
Attorney, Agent, or Firm—John H. Widdowson

[57] ABSTRACT

An adjustment apparatus for a disc plow has a frame and disc assembly. A tongue on the frame is pivotal to change the position of the disc assembly relative the ground. Telescopic adjustment apparatus is mounted on the tongue and the disc assembly. Powering means is mounted with the telescopic member to in use vary the length to in turn change the relative position of the tongue assembly and disc assembly for the purpose of changing the angular position of the disc assembly.

2 Claims, 6 Drawing Figures

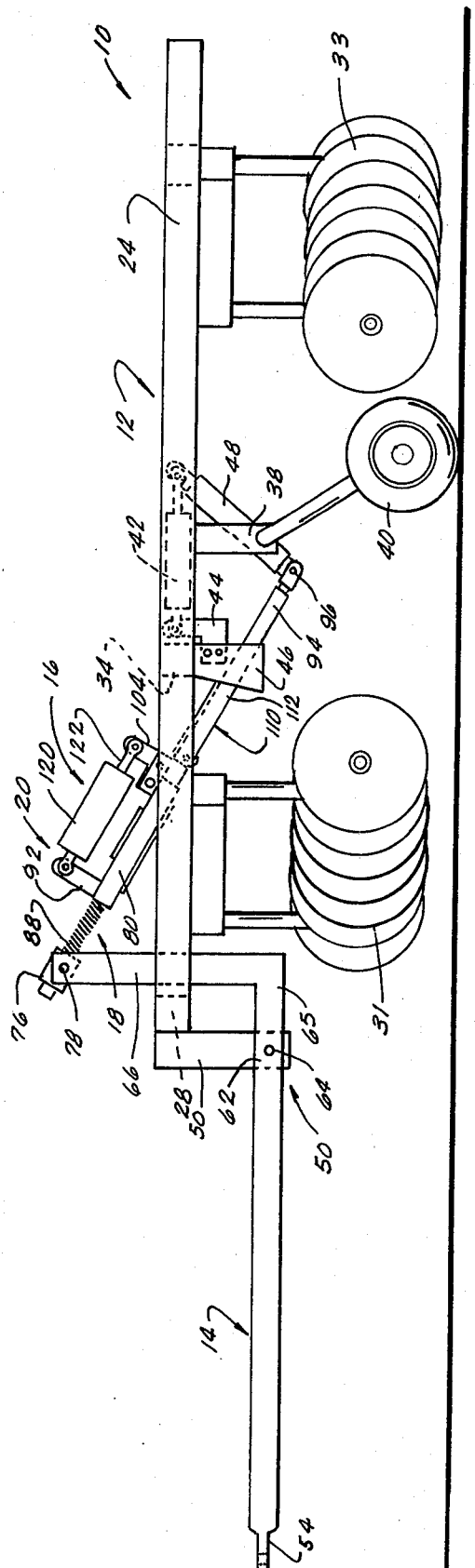

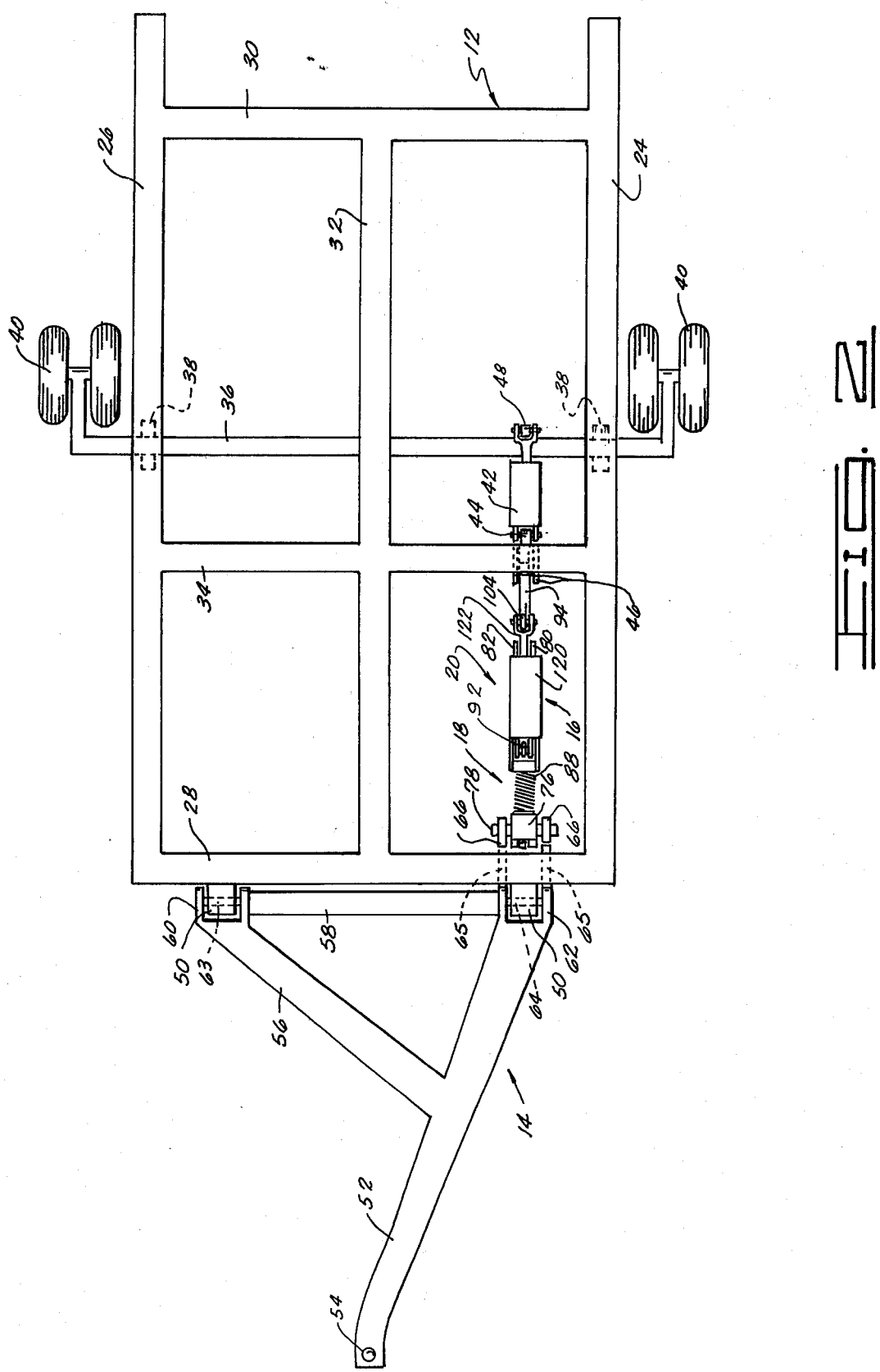

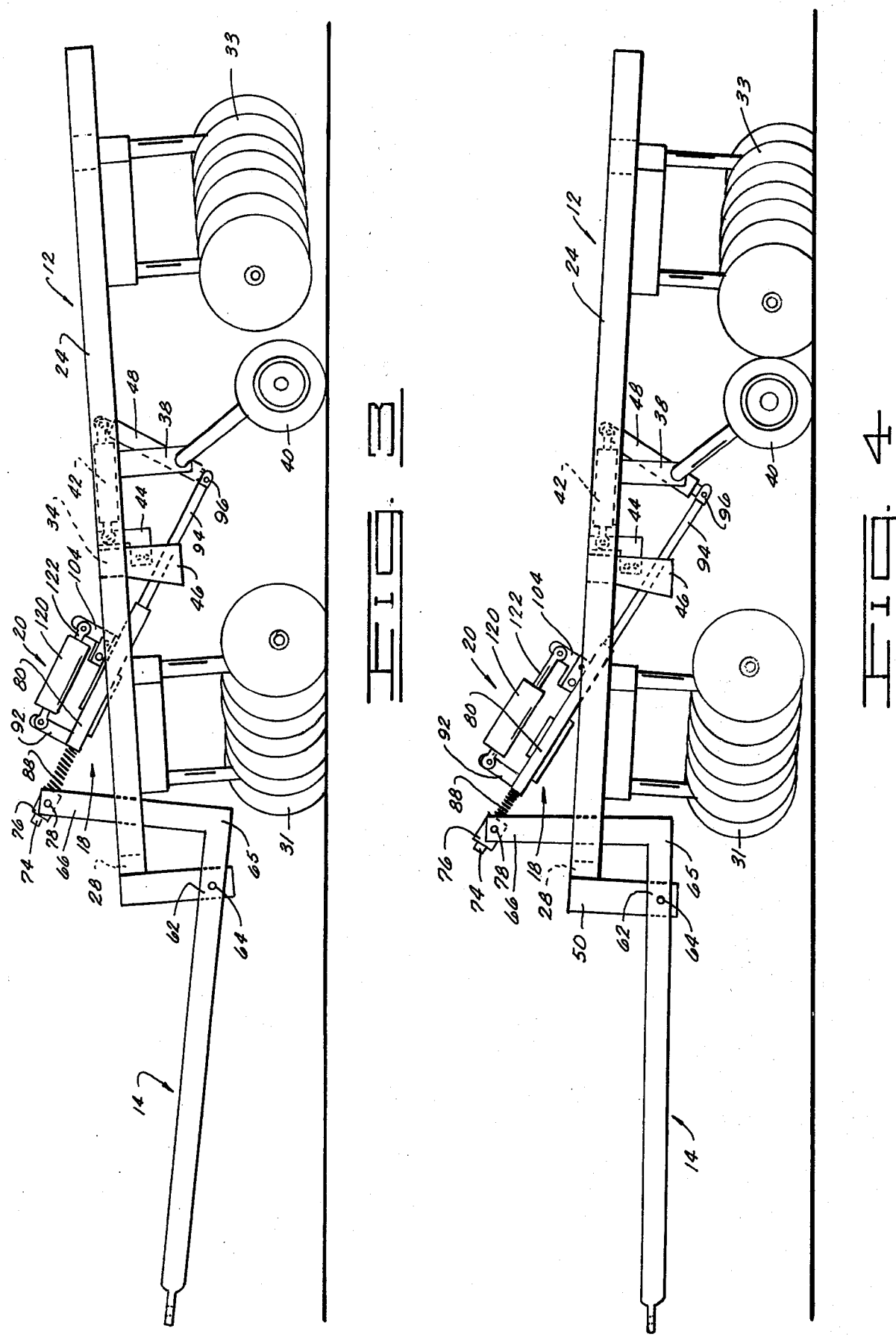

ADJUSTMENT MEANS FOR OFFSET DISC

BACKGROUND OF THE INVENTION

The invention is related to powered adjustment apparatuses for disc implements, particularly for adjusting penetration of the discs. In the prior art all farm implement discs have some type of apparatus to change the relative penetration of the forward row or rows of discs relative to the penetration of the rear row or rows of discs. The adjustment is necessary so the disc can be properly operated to plow the soil for varying land and soil conditions. Generally the structure of a prior art disc implement includes a frame which has a plurality of discs mounted therebelow, and a tongue pivotally mounted on the frame. The tongue's position relative to the frame adjusts the angular relation of the frame and the ground thereby adjusting the relative penetration of the discs. In use the tongue must be kept in a rigid position relative to the frame. In the prior art a threaded member is pivotally mounted between the frame and some portion of the tongue or the tongue assembly and a crank-like handle is provided on one end of the threaded member so it can be rotated by hand to change the relative position of the tongue and the frame. In use of the prior art adjustment apparatuses for the discs a person must stop the tractor, dismount, adjust the disc by turning the crank as needed, then remount the tractor and continue. For terrain conditions where the land is hilly or varies considerably, a great deal of adjustment is required and this becomes considerably time-consuming as the operator must frequently stop the tractor to adjust the disc. In practice using prior art disc adjustment apparatuses it has been found that after use of the disc for a period of time the threaded member will possibly become bent, thus making it difficult to rotate requiring replacement or repair. No prior art disc implement is known which has a powered and remotely controllable adjustment apparatus operable to adjust relative penetration of the discs.

SUMMARY OF THE INVENTION

In one preferred specific embodiment, an adjustment means for a common disc-like plow implement includes a telescopic member pivotally mounted between the tongue apparatus and the frame of the disc and having a powering device mounted on the telescopic member connected with its opposed ends. In use the powering apparatus mounted on the telescopic member changes the length of the telescopic member which in turn changes the relative position of the tongue assembly and the frame to provide for varying the relative position of the frame and the ground.

One object of this invention is to provide an adjustment means for a disc overcoming the aforementioned disadvantages of the prior art devices.

Another object of this invention is to provide an adjustment apparatus structure for a conventional disc implement which will enable the operator of a tractor when pulling the disc in use to adjust the relative penetration of the forward and aft portions of the disc from his seat on the tractor while in motion.

One other object of this invention is to provide an adjustment apparatus for a common disc implement that has a frame with discs supported therebelow and a tongue assembly mounted with the frame in pivotal relation with the tongue being pivotable to change the relative position of the frame and the ground, wherein the adjustment apparatus has a telescopic member mounted between the tongue assembly and the frame and a powering apparatus mounted on the telescopic member to in use extend and retract the telescopic member to change the relative position of the tongue and the frame and further change the relative position of the frame and the ground for adjustment of penetration of the discs.

Still, another object of this invention is to provide an adjustment apparatus for an offset disc implement which has a hydraulically powered telescopic member mountable with the disc implement usable to change the relative position of the tongue assembly portion and the frame to adjust the penetration of the discs mounted on the forward portion of the implement relative to the penetration of discs mounted on the aft or rear portion of the implement.

Various other objects, advantages, and features of the invention will become apparent to those skilled in the art from the following discussion, taken in conjunction with the accompanying drawings, in which:

DESCRIPTION OF THE DRAWINGS

FIG. 1 is a side elevation view of an offset disc implement in a road transport position having the adjustment apparatus of this invention with the locking member in place;

FIG. 2 is a top plan view of the disc implement of FIG. 1, shown without the rows of discs;

FIG. 3 is a side elevation view of the disc implement shown in FIG. 1 with the telescopic member retracted and the frame positioned for greater penetration of the forward discs;

FIG. 4 is a side elevation view of the disc implement shown in FIG. 1 with the telescopic member extended and the frame positioned for greater penetration of the rear or aft discs;

FIG. 5 is a side elevation view of the telescopic member and removably mountable locking member therefor; and FIG. 6 is a top plan view of the telescopic member and locking member shown in FIG. 5.

The following is a discussion and description of preferred specific embodiments of the adjustment means structure of this invention, such being made with reference to the drawings, whereupon the same reference numerals are used to indicate the same or similar parts and/or structures. It is to be understood that such discussion and description is not to unduly limit the scope of the invention.

DESCRIPTION OF PREFERRED EMBODIMENT

Referring to the drawings in detail and in particular to FIG. 1, a disc-like plow implement, indicated generally at 10, is shown with the adjustment apparatus of this invention. The disc implement 10 is a common or conventional offset type disc implement having a frame 12 and a tongue assembly 14. The adjustment apparatus is indicated generally at 16 and includes a telescopic member 18 with a powering device 20 mounted thereon.

The disc implement 10 shown in the drawings in the type commonly referred to as an offset disc and it includes a rectangular box-like frame structure, as shown in FIG. 2, with elongated opposite side members 24 and 26, a forward transverse member 28, a rear transverse member 30, a centrally disposed longitudinal member 32 and a centrally disposed transverse member 34. A pair of angularly oriented rows of discs 31 and 33 are mounted below the frame 12 on the forward and rear portions thereof respectively. A wheel apparatus is mounted in the center portion of the frame including a pivotally mounted axle 36 supported in mounts 38 below the frame side members 24 and 26. The pivotally mounted axle 36 has downwardly extending outer ends with spindles thereon for mounting the wheels 40. A hydraulic cylinder 42 is used to pivot the axle 36. The hydraulic cylinder 42 is supported on one end at a mount member 44 attached to a mount support member 46 depending from the transverse frame member 34 and on its opposite end to an arm 48 secured to the axle 36. The mount member 46 consists of a pair of parallel plate members welded to the center transverse member 34 in a depending relation with the mount member 44 supported therebetween by a pair of fasteners. The plates of the mount member 46 extend substantially from the transverse member 34 as shown in FIG. 1 and they function as a guide for the inner member of the adjustment apparatus 16 to restrain transverse bending thereof. Extension and retraction of the cylinder 42 respectively raises and lowers the frame 12 relative to the ground by changing the position of the wheels 40 relative to the frame.

On the forward portion of the disc implement 10 the tongue 14 is mounted with the forward end portion thereof. The tongue assembly 14 is supported by a pair of mount members 50 that are secured to the frame and extend downwardly from the front side of the forward transverse frame member 28. The tongue assembly 14 includes an elongated member 52 extending from one of the mounts 50 having a hitching end portion 54 on its forward end, and joined by a second member 56 to the other mount of the pair. A transverse member 58 connects the sides of the tongue assembly at the mounts on the rear portion of the elongated member 52 and the other member 56. As can be seen in the combination of views 1 and 2 the tongue assembly is attached with the mounts 50 by clevis-like structures 60 and 62 having pivot pins 63 and 64 respectively. The clevis-like structure 62 has a pair of rearwardly extending portions 65 and upwardly extending portions 66 with the rear portion of the tongue assembly 14 being essentially L-shaped when seen from the side as in FIG. 1. Tongue portions 65 and 66 are integrally secured with the clevis-like structure 62 and they are provided for support of the adjustment apparatus.

The disc frame 12 and tongue assembly 14 are constructed so that they can be pivoted in their supported relation to change the penetration of the forward row of discs 31 and the rear row of discs 33. In use, the hitch end portions 54 of the tongue remains substantially stationary relative to the ground because it is attached to the drawbar of a tractor or other towing vehicle, the discs 31 and 33 run in the ground and the wheels 40 are raised or they can run on the ground and can, if desired, support a portion of the weight of the disc implement. Lowering of the forward row of discs 31 into the ground below the level of the rear row of discs 33 causes the frame 12 to tilt with the forward portion thereof being downwardly as shown in FIG. 3; this causes the upright members 66 to be moved rearward on their upper end portion or away from the transverse forward frame member 28. When the rear or aft row of discs 33 is lowered to a level lower than the forward row of discs 31, the forward portion of the frame 12 raises and the rear portion thereof lowers so the tongue's upright members 66 move in a forward direction or toward the transverse forward frame member 28 as shown in FIG. 4. The adjustment apparatus 16 of this invention provides a powered mechanical linkage or connection between the tongue's upright members 66 and the frame 12 to accomplish the described movement of the tongue assembly 14 relative to the frame 12. It is to be noted that the specific structure of the tongue assembly may structurally vary between manufacturers of disc implements; however, they operate basically the same in that motion of the tongue assembly or a portion of the tongue assembly relative to the frame supporting the rows of discs is required to accomplish the penetration adjustment for the discs. Also, it is to be noted that the adjustment apparatus of this invention is shown and described with an offset type of disc implement, however, it can be used with other types of disc implements, for example, a tandem type disc implement.

FIGS. 5 and 6 show in detail the structure of the telescopic member 18 and the lock member. The telescopic member 18 generally includes first end portion or an outer telescopic member 70 and a second end portion or an inner telescopic member 72 with the inner member 72 slidably engaged in the outer member 70 and each of the members having a mount for mounting opposite ends of the powering device 20. The first end portion or outer member 70 has a shaft 74 extending from the mounted end portion thereof. The shaft 74 is used to mount the outer member 70 in a sleeve member 76 which is mounted between the tongue upright members 66 on a shaft 78. The outer member 70 has a pair of opposed side members 82 and 80 secured on their end portions at the shaft end portion of the outer member. Preferably, the side members 82 and 80 are generally rectangular plate-like members connected on their upper and lower surfaces by plate members 84 and 86 to provide a partially enclosed passageway or guide between them for one end portion of the inner member 72. The shaft 74 mounts a helical spring 88 adjacent to the sleeve member 76 when mounted and it has an aperture 90 in its outermost end to receive a retaining clip or the like. The helical spring 88 acts in compression to absorb shock forces imparted on the adjustment apparatus 16 thus preventing damage to it. A lug 92 having an aperture is secured to the outer telescopic member 70 at the shaft end portion thereof for mounting one end of the powering device 20. The second end portion or inner telescopic member 72 has an elongated bar-like portion 94 with a clevis-like yoke 96 on one end thereof and a powering device mounting lug assembly in a mid-portion thereof. The free end of the inner member's bar portion 94 is indicated at 98 and is disposed between the sides 80 and 82 of the outer telescopic member 70. The mounting lug portion of the inner member 72 includes a stop member in the form of a plate member 100, preferably welded to the top of the bar portion 94 having a flange 102 extending upwardly therefrom. A mounting lug 104 is secured to the flange 102 by fasteners 106 and 108 with fastener 108 being removable from the flange 102 and the mounting lug 104 for pivoting of the mounting lug to aid in removal of the powering device 20. The plate 100 of the mounting lug is a stop member that is positioned to slide on one side of the outer member sides 80 and 82 and to contact the outer member upper plate 84 to limit the retracting motion of the telescopic member 18. Plate member 84 is a stop member because it limits retraction of the telescopic member 18. The telescopic member locking assembly, indicated generally at 110, is shown in detail adjacent to the inner member 72 in FIGS. 5 and 6. The locking assembly 110 has an elongated generally cross-sectionally U-shaped spaced member 112 sized to slip over three sides of the inner member's bar portion 94. An aperture 114 is provided in one end of the spacer member 112 to receive a locking pin. An aperture 116 is provided in the inner member bar portion 94 for receiving the locking pin of the locking assembly 110. When the locking member 112 is fitted on the inner member bar portion 94, it slips over the bar portion so that a locking pin can be inserted through the apertures 114 and 116 to support it in place. FIG. 1 shows the locking assembly 110 in place on the telescopic member 18. The locking assembly 110 is used normally when the disc implement 10 is pulled on the road and it is desired to fix the length of the adjustment apparatus 16 to prevent inadvertent retraction. Additionally the locking assembly 110 is usable to fix the length of the adjustment apparatus 16 so that the powering device 20 can be removed and the implement can still be transported on the road.

Preferably, the powering device 20 is a hydraulic cylinder and piston assembly remotely operable from the towing vehicle. Preferably, the hydraulic cylinder is mounted with the adjustment apparatus with the cylinder portion 120 attached to the mounting lug 92 on the telescopic outer member 70 and the piston portion 122 attached to the mounting lug 104 on the telescopic inner member 72. It is to be noted that the powering device 20 can be any suitable powered and remotely controllable linear extendable device, for example, air operated piston and cylinder apparatus, or a reversible motor and screw member apparatus. In practice, it has been found most desirable to use a hydraulic piston and cylinder apparatus as the powering device 20 because many tractors are provided with auxiliary power units of the hydraulic type. In mounting the hydraulic cylinder and piston assembly, the end of the cylinder 120 is attached to the lug 84 by a coupling pin and the end having the piston 122 is attached to the lug 104 by a coupling pin. Installation and removal of the hydraulic powering device is preferably accomplished by use of the locking assembly 110. With the locking member 112 in place as shown in FIG. 1 the fastener 108 attaching the lug 104 to the flange 102 can be removed thus allowing the flange 104 to pivot about the fastener 106 so that compression or tension forces on the hydraulic powering device can be relieved thereby allowing for its easy removal from the adjustment apparatus 16. As shown in FIG. 1 the locking member 112 rests against the mount support 46 and the free end of the outer telescopic member 70 abuts the pin receiving end of the member 112, so further retraction of the telescopic member 18 is prevented. When installing the hydraulic powering device the ends of the cylinder 120 and piston 122 can be attached to the lugs by pivoting lug 104 as needed, then the piston 122 can be moved to a position so fastener 108 can be inserted.

When mounted for use the adjustment apparatus 16 has the shaft 74 of the outer telescopic member 70 mounted in the sleeve 76 between the tongue's upright members 66 and the clevis-like yoke portion 96 of the telescopic inner member 72 is mounted with the lower end of the wheel pivot arm 48. The telescopic member inner member 72 bar portion 94 is positioned between the sides of the mount 46 as shown in FIG. 2 and the hydraulic cylinder powering device is mounted with the mounting lugs 84 and 104. Preferably, the hydraulic cylinder 120 is connected with the hydraulic auxiliary power unit of a towing vehicle and controllable to provide selective extension and retraction and partial extension and retraction of the piston 122. Essentially complete retraction of the hydraulic cylinder's piston 122 will cause shortening of the telescopic member 18, thus moving the disc implement 10 to the position shown in FIG. 3 with the forward row of discs 31 vertically disposed below the aft or rear row of discs 33. Essentially complete extension of the hydraulic powering device's piston 122 will cause extension of the telescopic member 18 thus positioning the disc implement 10 as shown in FIG. 4 wherein the rear row of discs 33 is vertically below the forward row of discs 31. It is to be noted that FIGS. 3 and 4 illustrate generally the limits of operation of the adjustment apparatus 16 and the disc implement 10; however, they may or may not be practical positions for operating the implement. Generally, both discs penetrate the ground with either the forward discs 31 or the rear discs 33 being the deeper depending upon the ground conditions and the terrain in which the disc implement is being used. It is to be noted that the inner telescopic member 72 is attached to the lower portion of the wheel positioning arm 48. With the adjustment apparatus 16 mounted with the disc implement in this manner, raising and lowering of the wheels 40 provides for some degree of tilting of the frame 12 relative to the ground. It is possible to mount the adjustment apparatus inner telescopic member 72 on a stationary portion of the frame 12 and it will function similarly as described hereinbefore to change the angular relation between the tongue assembly 14 and the frame 12. In some styles of conventional disc implements the adjustment apparatus for them is connected between the wheel moving mechanism as shown here while in others it is connected directly with the frame or some supporting structure attached to the frame.

In the manufacture of the adjustment apparatus for a disc of this invention, it is obvious that same can be easily constructed to achieve the end product. The specific structure of the adjustment apparatus can be made compatible with an offset disc implement such as the one shown or others, for example tandem discs, having generally similar frame and tongue apparatus. The telescopic member of the adjustment apparatus can be varied in length and strength capacity depending upon the particular disc on which it is to be used. It can be constructed to utilize hydraulic cylinder type powering devices or other powering devices as described.

In the use and operation of the adjustment means for a disc of this invention, it is seen that same provides a remotely controllable adjustment apparatus for a disc implement which will in use eliminate the heretofore necessity of a person using the implement having to frequently or periodically stop and readjust the cutting position of the implement while operating such in a terrain where frequent adjustments are required. The adjustment apparatus when mounted with a disc implement makes it possible for the operator of a tractor pulling the implement to adjust the cutting position of the disc from his seat on the tractor while the tractor and the disc is in motion. The locking feature of the adjustment apparatus makes it possible for the hydraulic cylinder or powering device to be removed from the implement for use elsewhere as needed during periods when the implement is not in use; and additionally the locking member assures that the frame and tongue assembly will remain in the road use position when the locking member is properly placed. In practice it has been found that the adjustment of the apparatus of this invention reduces considerably the time necessary to till a field in terrain which requires frequent adjustment of the disc for proper tilling.

As will become apparent from the foregoing description of the applicant's adjustment apparatus structure, relatively inexpensive and simple means have been provided to adjust the relative position of the frame and tongue apparatus of a disc implement. The adjustment apparatus provides a device which can be attached to a common or conventional disc implement which will enable the operator of a vehicle pulling the disc implement to adjust the relative position of the discs thereof in the ground when the implement is in use. The adjustment apparatus is economical to manufacture, simple to use, and when used will result in a considerable time savings in the operation of discing or cultivating a field in terrain where frequent adjustments to the disc must be made.

While the invention has been described in conjunction with preferred specific embodiments thereof, it will be understood that this description is intended to illustrate and not to limit the scope of the invention, which is defined by the following claims.

I claim:

1. In a common disc-like plow implement having a frame means rigidly supporting a disc assembly having a plurality of spaced discs mounted on a rotatable shaft to turn with same, and having a tongue means pivotally mounted on said frame means for operably connecting said implement with a towing vehicle, said tongue means being pivotal relative to said frame means to change the angular position of said disc assembly relative to the ground, the improvement, comprising, an adjustment means for said disc assembly comprising:

a. a telescopic member pivotally mounted in one end portion with said tongue means and pivotally mounted on its opposite end portion with said frame means, b. said telescopic member having a first end portion pivotally mounted with said tongue means and a second end portion slidably engaged with said first end portion, said second end portion being mounted with said frame means, c. a fluid actuated piston and cylinder powering means having an extendable and retractable piston rod and having one end thereof mounted with said telescopic member first end portion and having an opposite end thereof mounted with said telescopic member second end portion to in operation vary the length of said telescopic member, thereby changing the relative position of said tongue means and said disc assembly which further changes the angular position of said disc assembly relative to the ground level, said telescopic member first end portion having a mount member resiliently mounted on one end portion thereof and a lug member rigidly secured on said one end portion thereof, said telescopic member second end portion having a lug member on a mid portion thereof, a free end portion on one end portion thereof and a mounting yoke on its opposite end portion, said free end portion being engagable with said telescopic member first end portion, said telescopic member first end portion having a stop member to limit retraction of said telescopic member second end portion, and d. said adjustment means having a locking member removably mounted with said telescopic member to in use engage said second end portion of said telescopic member and said frame means to limit retraction of said telescopic member and fix the relative position of same and said disc assembly.

2. The adjustment means of claim 1, wherein:

a. said frame means has a wheel means including means to raise and lower wheels, b. said tongue means has a hitch portion connectable with said towing vehicle and an upright member mounted with one end portion of said telescopic member, said hitch portion and said upright member are movable by said adjustment means relative to said frame means, and c. said telescopic member second end portion has said mounting yoke mounted with said means to raise and lower wheels.

* * * * *